(12) United States Patent
Retamal

(10) Patent No.: US 8,328,410 B1
(45) Date of Patent: Dec. 11, 2012

(54) IN-LINE MULTI-CHAMBER MIXER

(75) Inventor: Antonio Retamal, Oxford, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 963 days.

(21) Appl. No.: 12/075,844

(22) Filed: Mar. 14, 2008

(51) Int. Cl.
*B01F 7/20* (2006.01)

(52) U.S. Cl. .................. 366/149; 366/168.1; 366/172.1; 366/177.1; 366/263; 366/290; 366/293; 366/315; 251/63.5

(58) Field of Classification Search .................. 366/144, 366/149, 167.1, 168.1, 172.1, 173.1, 177.1, 366/262, 263, 290, 293, 315, 309, 312, 325.92, 366/325.93; 251/63.5, 63.6
See application file for complete search history.

(56) References Cited

U.S. PATENT DOCUMENTS

| | | | | |
|---|---|---|---|---|
| 723,900 A | * | 3/1903 | Murphy | 366/164.4 |
| 1,030,203 A | * | 6/1912 | Paulsen | 165/88 |
| 1,281,351 A | * | 10/1918 | Groch | 366/164.2 |
| 1,587,115 A | * | 6/1926 | Govers | 165/109.1 |
| 1,949,696 A | * | 3/1934 | Schoneborn | 366/265 |
| 1,976,955 A | * | 10/1934 | MacLean | 366/264 |
| 2,273,835 A | * | 2/1942 | Cornell | 366/169.2 |
| 2,461,276 A | * | 2/1949 | Hetherington | 508/539 |
| 2,552,960 A | * | 5/1951 | Grieshaber et al. | 123/90.14 |
| 2,577,095 A | * | 12/1951 | Walker | 261/93 |
| 2,584,424 A | * | 2/1952 | Cornell | 366/263 |
| 2,706,108 A | * | 4/1955 | Miner | 366/290 |
| 2,787,447 A | * | 4/1957 | Crawford | 366/131 |
| 2,882,149 A | * | 4/1959 | Willems | 241/80 |
| 2,929,107 A | * | 3/1960 | Andrew | 264/3.6 |
| 2,996,287 A | * | 8/1961 | Audran | 366/265 |
| 3,110,646 A | * | 11/1963 | Mayhew et al. | 159/6.1 |
| 3,147,957 A | * | 9/1964 | Martin | 366/263 |
| 3,250,321 A | * | 5/1966 | Root | 165/94 |
| 3,389,970 A | * | 6/1968 | Scheibel | 422/259 |
| 3,400,915 A | * | 9/1968 | Onishi et al. | 366/290 |
| 3,845,938 A | * | 11/1974 | Schold | 366/144 |
| 3,927,838 A | * | 12/1975 | Soloviev et al. | 241/46.15 |
| 3,940,115 A | * | 2/1976 | Zipperer | 366/303 |
| 3,973,759 A | * | 8/1976 | Mizrahi et al. | 366/264 |
| 4,432,386 A | * | 2/1984 | Pacht | 137/327 |
| 4,453,829 A | * | 6/1984 | Althouse, III | 366/13 |
| 4,460,278 A | * | 7/1984 | Matsubara et al. | 366/149 |
| 4,813,786 A | * | 3/1989 | LeMaster | 366/251 |
| 4,893,941 A | * | 1/1990 | Wayte | 366/265 |
| 5,634,627 A | * | 6/1997 | Daido et al. | 251/335.3 |
| 5,836,686 A | * | 11/1998 | Ogier | 366/176.1 |
| 6,003,535 A | * | 12/1999 | Ollivier | 137/8 |

(Continued)

FOREIGN PATENT DOCUMENTS

JP 60125243 A * 7/1985
SU 1286258 A1 * 1/1987

*Primary Examiner* — Dimple Bodawala
(74) *Attorney, Agent, or Firm* — Gann G. Xu

(57) ABSTRACT

The present invention is directed to an in-line mixer for mixing a plurality of fluids to produce a mixed product. The mixer includes one or more mixing chambers, an impeller in each of the mixing chambers, one or more inlets coupled to injection valves for conveying the fluids into the mixing chamber, and an outlet for conveying the mixed product out of the mixing chamber. The in-line mixer is well suited to components, such as those used in making automotive OEM and refinish paints.

7 Claims, 6 Drawing Sheets

U.S. PATENT DOCUMENTS

| | | | | |
|---|---|---|---|---|
| 6,132,080 A | * | 10/2000 | Gurth | 366/286 |
| 6,435,707 B1 | * | 8/2002 | Mori et al. | 366/171.1 |
| 6,637,926 B1 | | 10/2003 | Auad | |
| 6,814,338 B2 | * | 11/2004 | Kajitani | 251/63.6 |
| 7,150,299 B2 | * | 12/2006 | Hertzler et al. | 141/94 |
| 7,431,568 B2 | * | 10/2008 | Brown et al. | 417/44.1 |
| 2004/0079417 A1 | | 4/2004 | Auad | |
| 2007/0104822 A1 | * | 5/2007 | Okabe | 425/550 |

\* cited by examiner

IN-LINE MULTI-CHAMBER MIXER

FIELD OF INVENTION

The present invention is directed to a mixer for mixing one or more fluids to produce a mixed product. The invention is further directed to a modular mixer having one or more mixing chambers. This invention is particularly directed to an in-line modular mixer having one or more mixing chambers.

BACKGROUND OF INVENTION

In paint manufacturing process, it is necessary to mix a plurality of ingredients or components such as pigment dispersions, colorants, concentrates, or other fluids or solid dispersions to produce a paint having desired physical properties such as color, opacity, saturation, and viscosity. Typically, the ingredients or components are mixed in a mixer or a series of mixers. A in-line mixer is a mixer that can continuously mix a plurality of ingredients or components based on a desired formulation. In a conventional in-line mixer, desired amounts of each of the ingredients or components are conveyed into the mixer according to the formulation via one or more inlets. The conveyed ingredients or components are then agitated by an impeller within a mixing chamber of the mixer. The mixed product is then conveyed out of the mixing chamber.

One example of such a conventional in-line mixer is described in detail in U.S. Pat. No. 6,637,926. Such a conventional in-line mixer, however, is not efficient enough to mix multiple ingredients due to the presence of dead volume within its mixing chamber. The impeller of such a conventional mixer occupies relatively a small portion of the mixing chamber volume. As a result, certain regions of the mixing chamber generate little or no turbulence even when the impeller is at high speed of rotation. Such little or no turbulence regions are known as dead volume. To reduce the dead volume, certain filler was introduced into the mixing chamber of the mixer. One example is described in aforementioned U.S. Pat. No. 6,637,926. However, introduction of such dead volume filler reduces desired useable volume in a mixing chamber. As a result, less amounts of ingredients can be mixed within the mixing chamber. Additionally, such dead volume fillers, contribute little or not at all to the mixing of the ingredients. These defects result in reduced productivity and mixing efficiency of such conventional in-line mixer.

Therefore a need still exists for an improved in-line mixer that not only provides higher turbulence, thereby increasing mixing efficiency but is also able to mix more amount of components than a conventional in-line mixer, such as that described in the patent mentioned earlier.

STATEMENT OF INVENTION

This invention is directed to a modular fluid mixer for mixing a plurality of fluids to produce a mixed product, said modular fluid mixer comprising: a) at least one mixing chamber having a mixing chamber surface; b) a drive shaft; c) an impeller positioned within the mixing chamber having a mixing boundary configured to dimensionally fit the mixing chamber surface, wherein said impeller comprises a plurality of mixing blades affixed to a circular disk and to a circular upper cap and a circular lower cap, wherein said circular disk is coupled to the drive shaft and is perpendicular to said drive shaft, and wherein said mixing blades are positioned rotationally symmetrical to the drive shaft; and d) at least one fluid inlet for feeding said plurality of fluids into the mixing chamber; and e) at least one fluid outlet for conveying said mixed product out of the mixing chamber.

This invention is also directed to a method for mixing a plurality of fluids using the modular fluid mixer. The method comprises the steps of: a) inputting the fluids into a mixer; b) mixing said fluids in the mixer to produce a mixed product, said mixer comprises: i) at least one mixing chamber having a mixing chamber surface; ii) a drive shaft; iii) an impeller positioned within the mixing chamber having a mixing boundary configured to dimensionally fit the mixing chamber surface, wherein said impeller comprises a plurality of mixing blades affixed to a circular disk and to a circular upper cap and a circular lower cap, wherein said circular disk is coupled to the drive shaft and is perpendicular to said drive shaft, and wherein said mixing blades are positioned rotationally symmetrical to the drive shaft; and iv) at least one fluid inlet for feeding said plurality of fluids into the mixing chamber; and v) at least one fluid outlet for conveying said mixed product out of the mixing chamber; and c) outputting said mixed product out of the mixing chamber

BRIEF DESCRIPTION OF DRAWING

FIG. 1 (A) is a side cross-sectional view of the impeller. FIG. 1 (B) is plan view of the impeller. FIG. 1 (C) is a three-dimensional perspective view of the impeller. Not all details of the impeller are shown in the figure.

DETAILED DESCRIPTION OF PREFERRED EMBODIMENT

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

The term "fluid" or "fluids" used herein refers to liquid, gas, or flowable solids. Examples of fluid include coating composition in organic or inorganic solvent, coating composition in aqueous solvent, solid pigment particle dispersions in organic or inorganic solvent, solid pigment particle dispersions in aqueous solvent, liquids, flowable small particle solids with or without solvent.

The term "rotational symmetry" or "rotationally symmetrical" means that when an object is rotated along its rotational symmetry center or axis, such that shape of the object is not changed during rotation.

An in-line mixer can typically have a power source, such as a motor unit, one or more mixing chambers and an impeller positioned within each of the mixing chambers, a coupling device that connects the power source and the mixing chambers, a drive shaft coupled to the impeller and the motor unit, and a number of inlets and outlets for inputting and outputting mixing ingredients. Each of the inlets and outlets are typically coupled to tubing or pipes that can supply the ingredients or remove the mixed products.

Figure 1A:
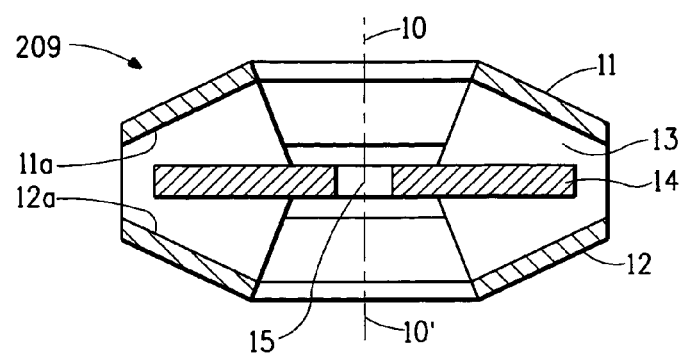
FIG. 1 shows one of the embodiments of an impeller of this invention.
Figure 1B:
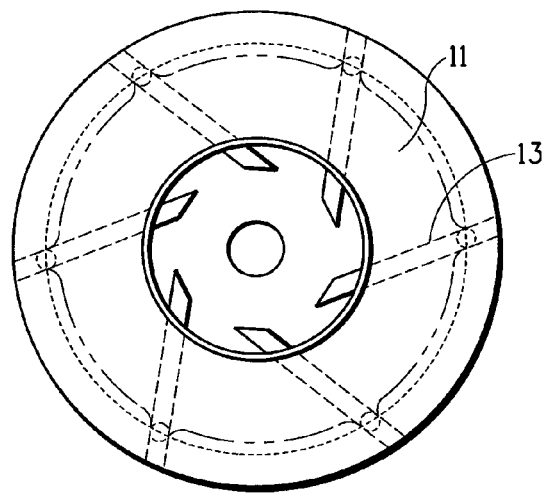
Figure 1C:
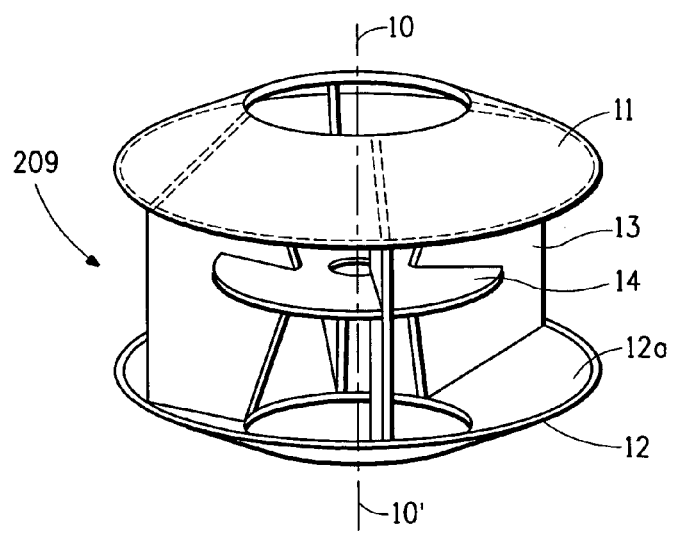

FIGS. 1A, 1B and 1C illustrate one of the embodiments of an impeller 209 used in in-line mixer of the present invention. Impeller 209 includes a circular upper cap 11 having an upper inner surface 11a and a upper cap radical center 10, and a circular lower cap 12 having a lower inner surface 12a and a lower cap radical center 10'; a plurality of mixing blades 13, each having a blade surface with an upper edge and a lower edge; and a circular disk 14 having a disk radical center 15, wherein circular disk 14 is positioned between upper cap 11 and lower cap 12 so that corresponding cap radical centers 10 and 10' and disk radical center 15 are aligned to form a shaft axis of the impeller, and wherein circular disk 14 is perpendicular and rotationally symmetrical to the shaft axis. Upper cap 11 is attached to mixing blades 13 at each of the upper edge at upper inner surface 11a, and lower cap 12 is attached to mixing blades 13 at each of the lower edge at the lower inner surface 12a. Mixing blades 13 are attached to circular disk 14 so that blades 13 are rotationally symmetrical to the shaft axis. The number of mixing blades 13 in an impeller 209 can be determined by those of ordinary skill in the art based on properties of components to be mixed. Typically, more than 2 blades are used. In one embodiment, 3 to 6 blades can be used. In another embodiment, 6 to 12 blades can be used. Entire impeller 209 is rotationally symmetrical to the shaft axis as defined by corresponding cap radical centers 10 and 10' and the disk radical center 15.

Figure 2:
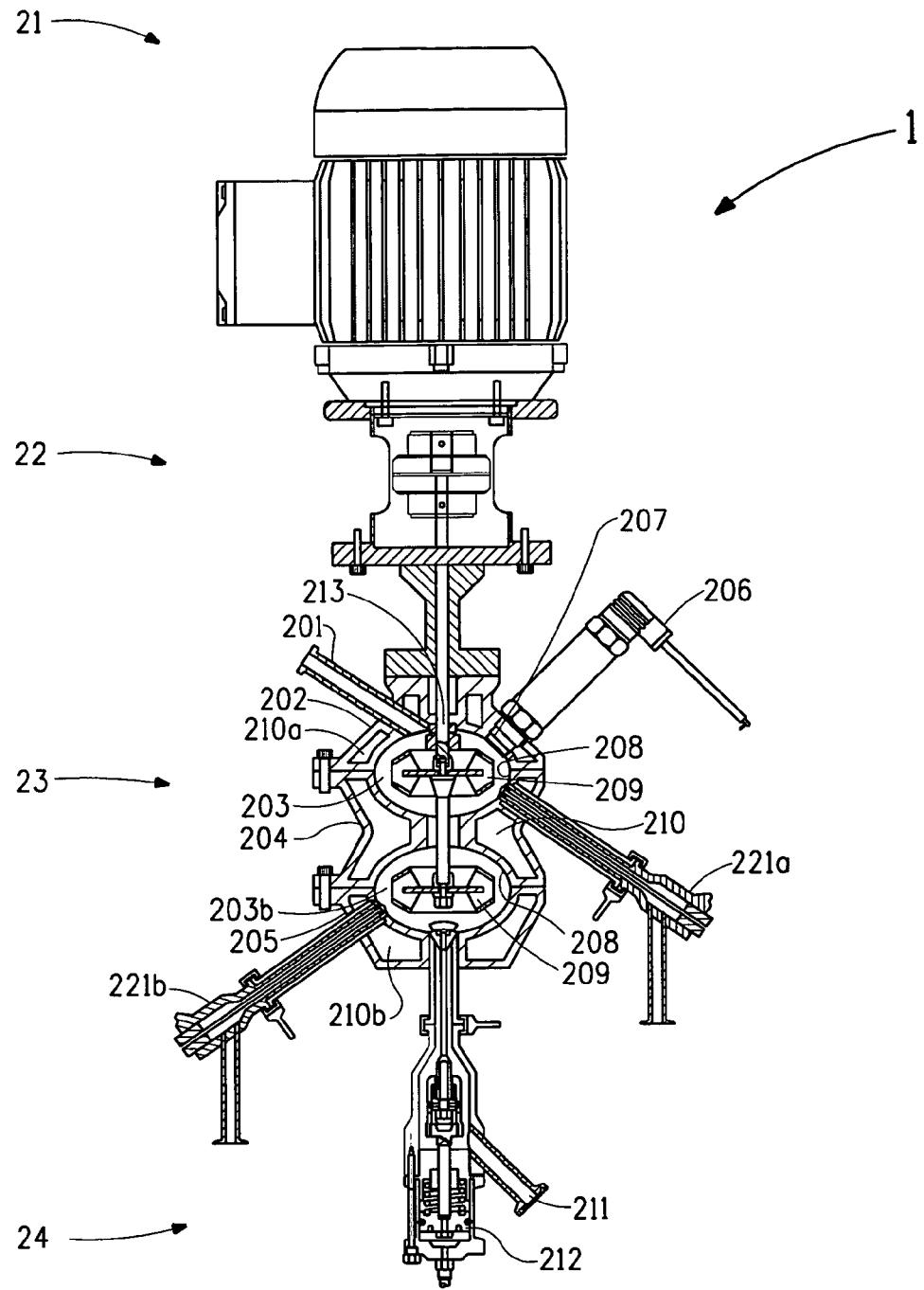
FIG. 2 shows a side view of one of the embodiments of an in-line mixer of this invention. The in-line mixer of FIG. 2 has been provided with two mixing chambers. Not all details of the mixer are shown in the figure.

FIG. 2, shows one of the embodiments of a modular fluid in-line mixer 1 for mixing a plurality of fluids to produce a mixed product. Mixer 1 can be provided with a mixing chamber assembly 23 coupled to a conventional motor unit 21 via a motor coupling unit 22. Preferably, mixing chamber assembly 23 is coupled to a conventional drainage unit 24. Mixer of FIG. 2 has two mixing chambers 203 and 203b each having one impeller 209 positioned within. Impellers 209 are attached to a drive shaft 213 that is coupled to the motor unit 21 via the coupling unit 22 to rotate drive shaft 213 at suitable rotational speeds. Mixer 1 is provided with one or more inlets, preferably coupled to injection valves 221a and 221b. Mixer 1 is provided an outlet 201 for conveying the mixed product. The mixer can have additional opening 207 that can be coupled, for example, to a sensing device 206, such as a viscosity sensor, or a sampling tube that can be used to withdraw small amounts of sample of the ingredients being mixed in mixing chambers 203 or 203b. Drainage unit 24 typically has a control assembly 212 that controls the opening and closing of the drainage and a drainage coupling 211 for draining the content from mixing chambers 203 or 203b. Motor unit 21, motor coupling unit 22 and drainage unit 24 are all well known in the art and can be functionally assembled, fitted, coupled, engineered, modified, or changed by those of ordinary skill in the art.

In one embodiment, mixing chamber 203 in FIG. 2 is formed by the upper portion 202 and a lower portion provided by an upper side of a mixing chamber coupling 204. The mixing chamber coupling 204 in this embodiment is also configured to have a lower side that can serve as an upper portion for a second mixing chamber 203b. Mixing chamber 203b is formed by an assembly of an upper portion provided by the lower side of the mixing chamber coupling 204 and a lower portion 205. If more mixing chambers are desired, one or more mixing chamber coupling 204 can be assembled repeatedly to form those desired mixing chambers. Each mixing chamber 203 or 203b has a mixing chamber volume 208 defined by corresponding upper portion and lower portion of said mixing chamber.

The upper portions and the lower portions, such as the upper portion 202, the lower portion 205 and the mixing chamber coupling 204, can have internal spaces, such as space 210, 210a and 210b shown in FIG. 2. These internal spaces can serve as thermal jackets and be filled with stationary or circulating carriers for modulating temperatures of the mixing chambers. The thermal jackets can be connected through connectors or tubing so that the carriers can be circulating through the thermal jackets. The carriers can be liquid or gas, such as air, nitrogen, water, oil, or other thermal mediating materials. Additional elements, such as pumps; thermal controlling mechanisms, such as a thermostat; a heating element; or a cooling element such as a radiator, a refrigerating unit; can be added to control the temperature and circulation of the carriers to modulate temperatures of the mixing chambers.

Figure 5A:
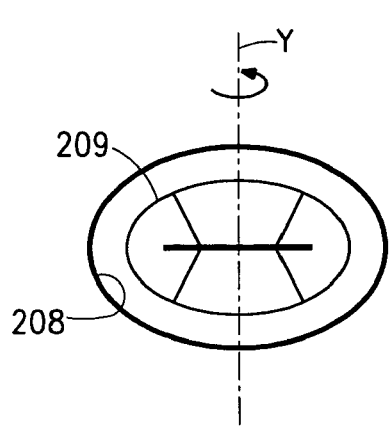
FIG. 5 shows cross-sectional view of schematic representations of different mixing chambers and corresponding impellers of different shapes. Not all details are shown.
Figure 5B:
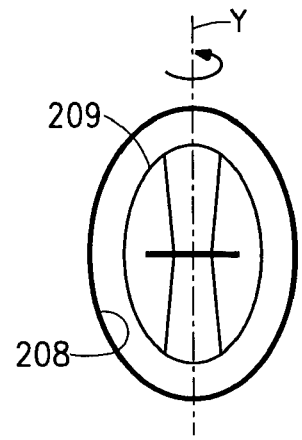
Figure 5C:
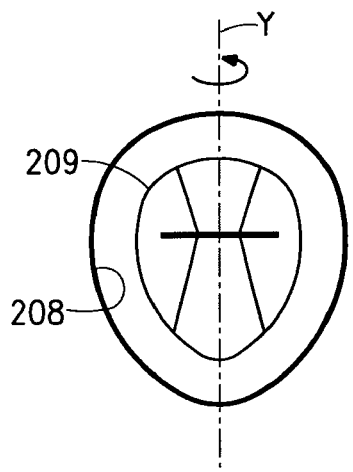
Figure 5D:
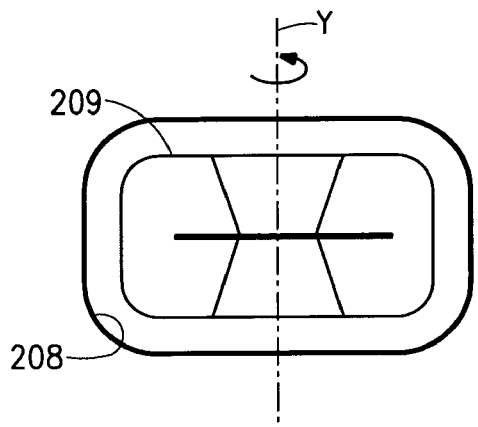
Figure 5E:
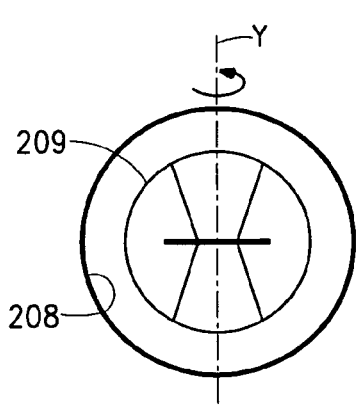
Figure 5F:
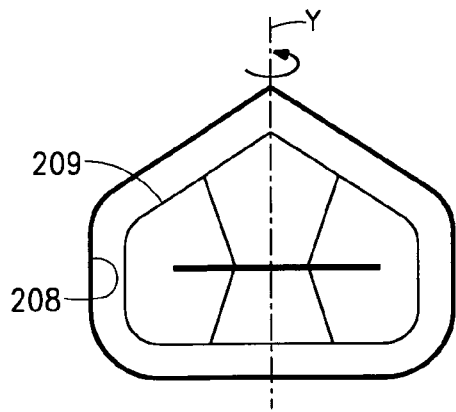
Figure 5G:
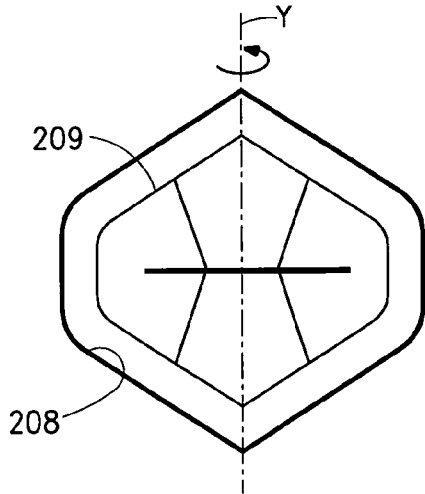
Figure 5H:
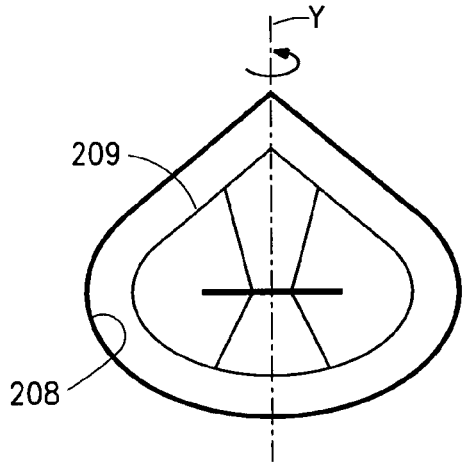
Figure 5I:
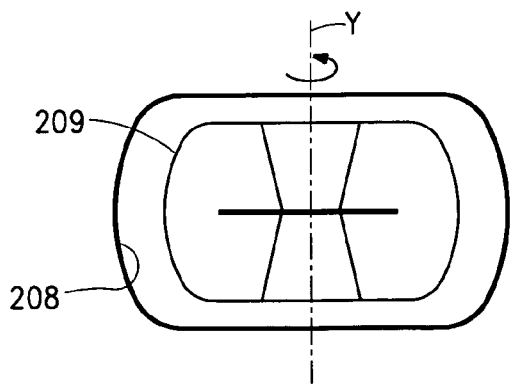

The impeller 209 is positioned within the space enclosed by the mixing chamber surface 208. The impeller has an overall cross-sectional area ranging from 5% to 99%, preferably 75% to 98% of the cross-sectional area of the mixing chamber so that there is substantially no dead volume within the mixing chamber. A dead volume is a certain region or space of a mixing chamber where there is little or no turbulence even when the impeller is at high speed rotation. Fluids in the dead volume are not efficiently mixed. In traditional mixer, a dead volume filler is used to reduce such dead volume. The mixer of this invention removed the need for such dead volume filler. The mixing boundary of the impeller is defined by the mixing blades, the upper cap and the lower caper of the impeller. The mixing boundary of the impeller can be configured by shaping the impeller mixing blades, the upper cap, the lower caper, or a combination thereof. In one embodiment, the mixing chamber surface encloses a 3-dimensional oblate spheroid space having a rotational symmetry axis co-axial to the drive shaft. The corresponding impeller is dimensionally configured to fit that space (FIG. 5A). Said rotational symmetry axis of the mixing chamber and the shaft axis of the impeller are co-axially aligned. Typically a drive shaft 213 can be assembled along the shaft axis to position said impeller in the mixing chamber and provide power to rotate the impeller. When additional impellers are desired, the drive shaft can be extended and coupled to the additional impellers. Examples of the mixing chambers include, but not limited to, (B) prolate spheroid, (C) egg shaped, (D) cylindrical, (E) spherical, (F) fused cylindrical and conical, (G) double conical, (H) fused spherical and conical, and (I) drum shaped as shown in FIG. 5. Corresponding outlines of impellers are schematically shown. Axis of rotational symmetry is shown as "Y" in FIG. 5.

The overall cross-sectional area of the impeller and the cross-sectional area of the mixing chamber can be readily determined by measuring or calculating such cross-sectional areas from a symmetrical cross-section through the center of drive shaft 213, such as a cross-section shown in FIG. 2. The overall cross-sectional area of impeller 209 is the area included within the outermost boundaries of impeller 209.

Figure 3:
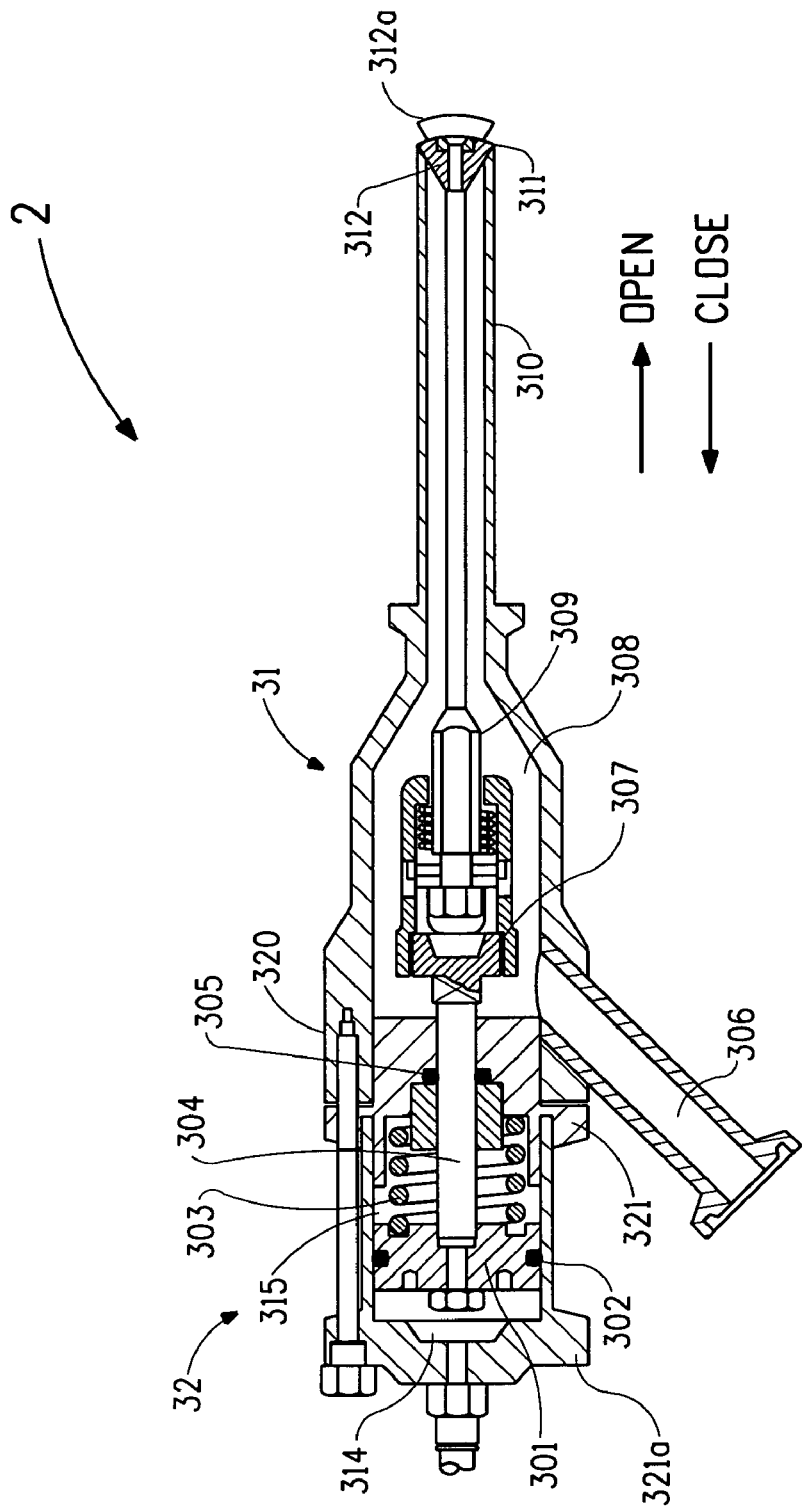
FIG. 3 shows a cross-sectional view of one of the embodiments the of an injection valve of this invention. Not all details of the injection valve are shown in the figure.

Mixer 1 is preferably coupled to one or more injection valves, such as 221a and 221b to convey the plurality of components to be mixed. One embodiment of injection valve 221a or 221b is shown in FIG. 3. Injection valve 2 of FIG. 3 includes a valve body 31 comprising a fluid channel 310, a fluid exit 311, a fluid entrance 306, a space within valve body 308, and a valve body coupling 320, wherein fluid entrance 306 is located at one end of fluid channel 310 distal to fluid exit 311. Injection valve 2 of FIG. 3 further includes an elongated seal member 309 having a seal head 312 at one end and a seal member coupling 307 at the other end of seal member 309, wherein seal member 309 is positioned within valve body 31 and seal head 312 is configured to dimensionally fit fluid exit 311. Injection valve 2 of FIG. 3 further includes a valve controller 32 coupled to seal member coupling 307 and the valve body coupling 320, wherein valve controller 32 moves seal member 309 to open and seal fluid exit 311 upon signals sent to valve controller 32. Seal head 312 at its open position 312a is also shown in FIG. 3.

Valve controller 32 includes an air tight space formed by a controller body coupling 321 and a cylinder 321a, which is provided with a first air inlet connected to a first sub-chamber 314 to allow air under pressure to enter in first sub-chamber 314 upon a signal, a second air inlet connected to a first sub-chamber 314 to allow air under pressure to enter in second sub-chamber 315 upon a signal. Controller body coupling 321 is coupled with a valve body coupling 320. A piston 301 positioned within cylinder 321a divides space within it into first sub-chamber 314 and second sub-chamber 315. Piston 301 is coupled to seal member coupling 307 via a valve controller shaft 304. A biasing mechanism 303 is positioned within cylinder 321a and is coupled to piston 301, wherein piston 301 can slide within cylinder 321a causing coupled seal member 309 to open or close fluid exit 311 according to signals sent to valve controller 32. The signals can be sent to valve controller 32 by modulating air pressure difference between first and the second sub-chambers 314 and 315, respectively. Biasing mechanism 303 is configured to move piston 301 causing coupled seal member 309 to seal fluid exit 311 when the air pressure difference between first and the second sub-chambers 314 and 31 is below a preset level. Piston 301 can have one or more sealing rings 302. Valve body coupling 320 can also have one or more seal rings 305. To open fluid exit 311 for injecting a mixing component into mixing chamber 203 or 203b, pressurized air can be injected into first sub-chamber 314 causing piston 301 to slide to move seal head 312 to its open position 312a. To close fluid exit 311 to stop injecting the mixing component into mixing chamber 203 or 203b, pressurized air can be injected into second chamber 315 causing piston 301 to slide thereby moving seal head 312 to its closed position sealing fluid exit 311. A conventional dual air actuator can be used to control the flow of the pressurized air so that only one of the chambers 314 or 315 is injected with the pressurized air. Biasing mechanisms 303 can be one or more sets of springs that are configured to provide sufficient force to slide piston 301 forcing the closure of fluid exit 311 when first chamber 314 is not pressurized or the pressurized air supply fails. As a result, accidental re-flux of mixed fluids back into fluid supply can be prevented. The force provided by biasing mechanism 303 can be modified and calibrated by those of ordinary skill in the art.

Figure 4:
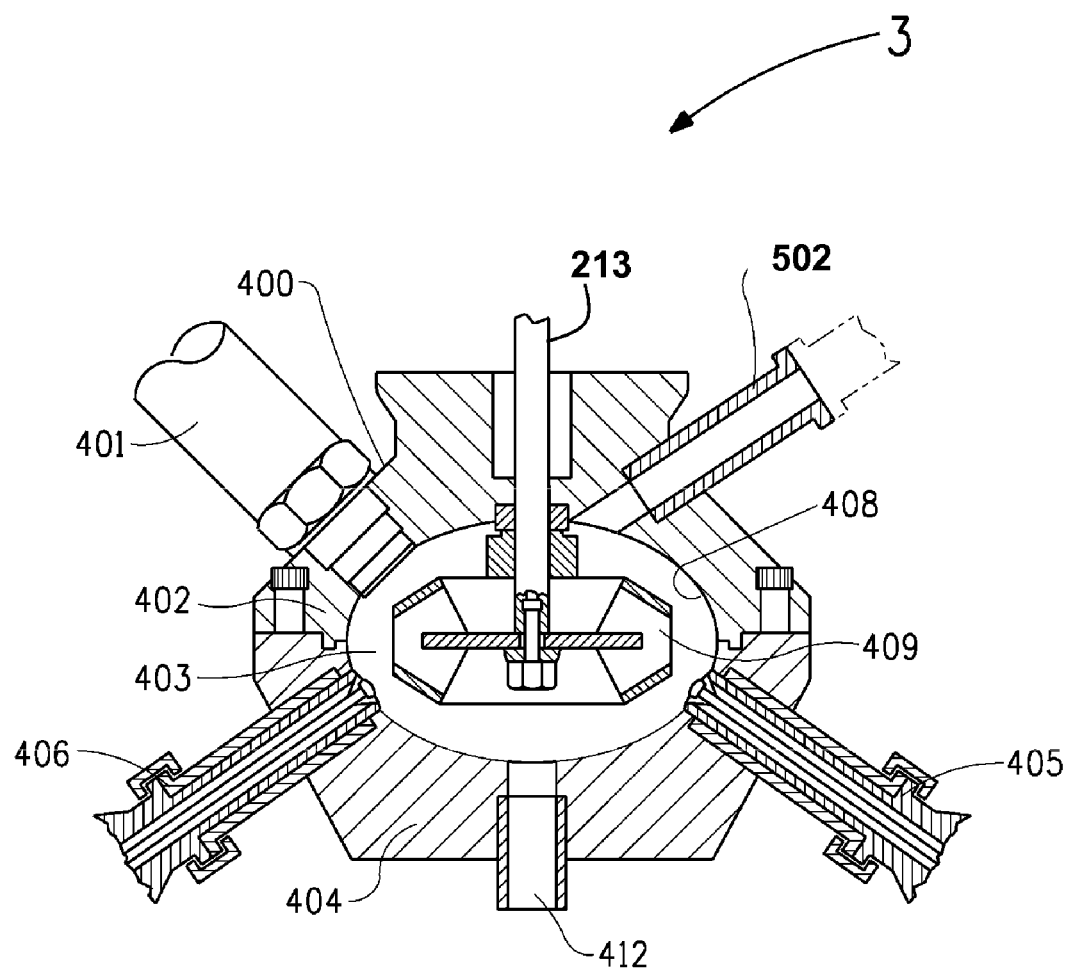
FIG. 4 shows a partial cross-sectional view of another embodiment the in-line mixer provided with a single-chamber mixer. Not all details of the mixer are shown in the figure.

FIG. 4, shows another embodiment, mixer 3 of this invention having a single mixing chamber without a thermal jacket. Mixer 3 has an upper portion 402 and a lower portion 404 to form mixing chamber 403 having an impeller 409 positioned therein on a drive shaft 213. Impeller 409 can be similar to impeller 209 described earlier. Mixer 3 can be coupled to one or more injection valves such as 405 and 406, which can be similar to valves 221a and 221b described earlier. A tubing 401 can be coupled to an opening 400. Tubing 401 can be further connected to a sensing device or can be used for withdraw small amount of samples, if desired. The sensing device, or other devices, can also be directly coupled to mixing chamber 403 through opening 400 with out tubing 401. The mixer can have an outlet 502 for conveying the mixed product out of mixing chamber 403.

When desired, cleaning solvent or gas such as nitrogen gas can be injected into the mixing chambers to clean said mixing chambers. Used cleaning solvent can be withdrawn from the drainage unit 412.

It is understood that modifications and variations can be made to the mixer, the impeller, or the injection valve without departing from the scope and spirit of this invention.

What is claimed is:

1. A modular fluid mixer for mixing a plurality of fluids to produce a mixed product, said modular fluid mixer comprising:
   a) at least one mixing chamber having a mixing chamber surface;
   b) a drive shaft;
   c) an impeller positioned within the mixing chamber having an overall cross-sectional area ranging from 75% to 95% of the cross-sectional area of the mixing chamber, wherein said impeller comprises a plurality of mixing blades affixed to a circular disk and to a circular upper cap and a circular lower cap, wherein said circular disk is coupled to the drive shaft and is perpendicular to said drive shaft, and wherein said mixing blades are positioned rotationally symmetrical to the drive shaft; and
   d) at least one fluid inlet for feeding said plurality of fluids into the mixing chamber; and
   e) at least one fluid outlet for conveying said mixed product out of the mixing chamber;
      wherein cross sectional shape of said mixing chamber surface is (A) 3-D oblate spheroid, (B) prolate spheroid, (C) egg shaped, (D) cylindrical, (E) spherical, (F) fused cylindrical and conical, (G) double conical, (H) fused spherical and conical, or (I) drum shaped;
      wherein the impeller is dimensionally configured to fit within the space of said mixing chamber so there is substantially no dead volume within said mixing chamber;
      wherein said overall cross-sectional area of the impeller and said cross-sectional area of the mixing chamber are determined from a cross-section through the center of said drive shaft and perpendicular to said circular disk, and said overall cross-sectional area of the impeller is the area included within the outmost boundaries of the impeller defined by the mixing blades, the circular upper cap and the circular lower cap of the impeller.

2. The modular fluid mixer of claim 1, wherein said mixing chamber is provided with a thermal jacket.

3. The modular fluid mixer of claim 1 comprising at least two said mixing chambers each having one said impeller positioned within.

4. The modular fluid mixer of claim 3, wherein said mixing chambers are provided with a thermal jacket.

5. The modular fluid mixer of claim 1 further comprising an injection valve coupled to said fluid inlet, wherein said injection valve comprises:
   i) a valve body (31) comprising a fluid channel (310), a fluid exit (311), a fluid entrance (306), and a valve body coupling (320), wherein said fluid entrance is located at one end of said fluid channel distal to said fluid exit;
   ii) an elongated seal member (309) having a seal head (312) at one end and a seal member coupling (307) at the other end, wherein said seal member is positioned within said valve body and said seal head (312) is configured to dimensionally fit the fluid exit (311); and
   iii) a valve controller (32) coupled to said seal member coupling (307) and the valve body coupling (320), wherein the valve controller moves the seal member to open and seal said fluid exit upon signals sent to said valve controller.

6. The modular fluid mixer of claim 5, wherein said valve controller comprises:
   i) an air tight cylinder having a first air inlet, a second air inlet, and a controller body coupling (321) coupled with the valve body coupling (320);
   ii) a piston (301) positioned within said cylinder, wherein said piston divides said cylinder into a first sub-chamber (314) functionally connected to said first air inlet and a second sub-chambers (315) functionally connected to said second air inlet, and wherein said piston is coupled to the seal member coupling (307) via a valve controller shaft (304); and
   iii) a biasing mechanism (303) positioned within the cylinder and coupled to the piston;
   wherein said piston can slide within the cylinder causing the coupled seal member to open or close the fluid exit according to signals sent to the valve controller, said signals are sent to the valve controller by modulating air pressure difference between the first and the second sub-chambers; and
   wherein the biasing mechanism is configured to slide the piston causing the coupled seal member to seal said fluid exit when said air pressure difference is below a preset level.

7. The modular fluid mixer of claim 1, wherein the mixed product is a coating composition.

\* \* \* \* \*